United States Patent
Keller et al.

(10) Patent No.: US 8,248,416 B2
(45) Date of Patent: Aug. 21, 2012

(54) EFFICIENT RAY TRACING WITHOUT ACCELERATION DATA STRUCTURE

(75) Inventors: Alexander Keller, Berlin (DE); Carsten Waechter, Berlin (DE)

(73) Assignee: Mental Images GmbH, Berlin (DE)

( * ) Notice: Subject to any disclaimer, the term of this patent is extended or adjusted under 35 U.S.C. 154(b) by 592 days.

(21) Appl. No.: 12/420,894

(22) Filed: Apr. 9, 2009

(65) Prior Publication Data

US 2009/0225081 A1 Sep. 10, 2009

Related U.S. Application Data

(63) Continuation-in-part of application No. 12/245,763, filed on Oct. 5, 2008, now Pat. No. 7,952,583, and a continuation-in-part of application No. 11/474,517, filed on Jun. 23, 2006, now Pat. No. 7,499,053, and a continuation-in-part of application No. 10/299,574, filed on Nov. 19, 2002, now Pat. No. 7,184,042, which is a continuation-in-part of application No. 09/884,861, filed on Jun. 19, 2001, now Pat. No. 7,227,547.

(60) Provisional application No. 61/057,168, filed on May 29, 2008, provisional application No. 60/977,603, filed on Oct. 4, 2007, provisional application No. 60/693,231, filed on Jun. 23, 2005, provisional application No. 60/265,934, filed on Feb. 1, 2001, provisional application No. 60/212,286, filed on Jun. 19, 2000.

(51) Int. Cl.
*G06T 15/50* (2011.01)

(52) U.S. Cl. ........ 345/426; 345/419; 345/420; 345/421; 345/422; 345/423; 345/424; 345/425; 345/427

(58) Field of Classification Search ........... 345/419–427
See application file for complete search history.

(56) References Cited

U.S. PATENT DOCUMENTS

| | | | |
|---|---|---|---|
| 5,305,430 A | 4/1994 | Glassner | |
| 5,847,711 A | 12/1998 | Kaufman | |
| 6,028,606 A | 2/2000 | Kolb | |
| 6,172,679 B1 | 1/2001 | Lim | |
| 6,373,485 B2 * | 4/2002 | Sowizral et al. | 345/421 |
| 6,529,193 B1 | 3/2003 | Herken | |
| 6,825,839 B2 | 11/2004 | Huang | |
| 6,862,026 B2 | 3/2005 | Zachmann | |
| 7,724,704 B2 * | 5/2010 | Simons et al. | 370/329 |
| 2003/0034968 A1 | 2/2003 | Abramov | |

(Continued)

OTHER PUBLICATIONS

Bittner, RDH: Ray Distribution Heuristics for Construction of Spatial Data Structures, Poster at the IEEE/EG Symposium on Interactive Ray Tracing, 2007.

(Continued)

*Primary Examiner* — Xiao M. Wu
*Assistant Examiner* — Todd Buttram
(74) *Attorney, Agent, or Firm* — Jacobs & Kim LLP; David Jacobs (57) ABSTRACT

Methods, systems and computer program code (software) products executable in a digital processor operable to simulate light transport in a scene by ray tracing (wherein the digital processor is operable to maintain an object list representing a list of objects associated with a boundary of the scene) include executing a ray tracing method that traces r rays through n objects by (1) partitioning the object list in a recursive manner to generate partitions and (2) culling away the partitions of objects from rays, without using an explicit auxiliary acceleration data structure.

36 Claims, 7 Drawing Sheets

U.S. PATENT DOCUMENTS

| | | | |
|---|---|---|---|
| 2003/0052874 | A1 | 3/2003 | Abramov |
| 2004/0125103 | A1 | 7/2004 | Kaufman |
| 2006/0158450 | A1* | 7/2006 | Ferguson et al. ............. 345/423 |
| 2008/0192044 | A1* | 8/2008 | Fowler et al. ................. 345/419 |
| 2009/0106530 | A1* | 4/2009 | Lauterbach et al. ............ 712/30 |
| 2009/0256836 | A1* | 10/2009 | Fowler et al. ................. 345/419 |
| 2010/0194751 | A1* | 8/2010 | Wald et al. .................... 345/426 |

OTHER PUBLICATIONS

Dmitriev, Faster Ray Tracing with SIMD Shaft Culling, Tech. Report MPI-I-2004-4-006, Max-Planck-Institut fur Informatik, Dec. 2004.
Dammertz, Improving Ray Tracing Precision by World Space Intersection Computation, Proc. 2006 IEEE Symposium on Interactive Ray Tracing, Sep. 2006, pp. 25-32.
Fournier, Ray Tracing Accelerator Based on a Hierarchy of 1D Sorted Lists, Proc. Graphics Interface, 1993, pp. 53-61.
Glassner, Introduction to Ray Tracing, Academic Press, 1989.
Glassner, Principles of Digital Image Synthesis, Morgan Kaufmann, 1995.
Goldsmith, Automatic Creation of Object Hierarchies for Ray Tracing, IEEE Computer Graphics & Applications (1987), No. 5, 14-20.
Haines, Shaft Culling for Efficient Ray-Traced Radiosity, Photorealistic Rendering in Computer Graphics (Proc. 2nd Eurographics Workshop on Rendering), Springer, 1994.
Kato, "Kilauea" Parallel Global Illumination Renderer, Fourth Eurographics Workshop on Parallel Graphics and Visualization, 2002, pp. 7-13.
Niederreiter, Random Number Generation and Quasi-Monte Carlo Methods, SIAM, Philadelphia, 1992.
Ochsenfahrt, Crema: A Parallel Hardware Raytracing Machine, ISCAS 2007. IEEE International Symposium on Circuits and Systems, 2007, pp. 769-772.
Quinn, Parallel Programming in C with MPI and OpenMP, McGraw-Hill, 2003.
Shirley, Realistic Ray Tracing, AK Peters, Ltd., 2000.
Shevtsov, Highly Parallel Fast KD-tree Construction for Interactive Ray Tracing of Dynamic Scenes, Computer Graphics Forum (Proc. Eurographics 2007) 26, 2007, No. 3, pp. 395-404.
Ullner, Parallel Machines for Computer Graphics, Ph.D. thesis, Cal-Tech, 1983.
Veach, Robust Monte Carlo Methods for Light Transport Simulation, Ph.D. thesis, Stanford University, 1997.
Waechter, Quasi-Monte Carlo Light Transport Simulation by Efficient Ray Tracing, Ph.D. thesis, Universitat Ulm, 2008.
Wald, Realtime Ray Tracing and Interactive Global Illumination, Ph.D. thesis, Saarland University, 2004.
Wald, Ray Tracing Deformable Scenes using Dynamic Bounding vol. Hierarchies, ACM Transactions on Graphics 26, 2006, No. 1.
Wierum, Logarithmic Path-Length in Space-Filling Curves, 14th Canadian Conference on Computational Geometry, Lethbridge, 2002.
Waechter, Instant ray tracing: The bounding interval hierarchy, Rendering Techniques 2006 (Proc. 17th Eurographics Symposium on Rendering), 2006, pp. 139-149.
Waechter, Efficient Simultaneous Simulation of Markov Chains, Monte Carlo and Quasi-Monte Carlo Methods 2007, Springer, 2007, pp. 669-684.
Waechter, Terminating Spatial Partition Hierarchies by a Priori Bounding Memory, Proc. 2007 IEEE/EG Symposium on Interactive Ray Tracing, 2007, pp. 41-46.
Wald, State of the Art in Ray Tracing Animated Scenes, Eurographics 2007 State of the Art Reports, 2007.
Zhou, Real-Time KD-Tree Construction on Graphics Hardware, ACM Trans. on Graphics 2008, No. 126.

* cited by examiner

20

```
void Intersect(int rsi, int rei, int tsi, int tei)
{
   if(rsi < rei && tsi < tei) // anything to intersect ?
   {
      BBox Box = ComputeBBoxOfObjects(tsi, tei);
      rei = DiscardRaysNotIntersectingBox(Box, rsi, rei);

if(rsi < rei) // any remaining rays ?
      {
         if(Terminate(rsi, rei, tsi, tei))
            RayObjectIntersect(rsi, rei, tsi, tei);
         else
         {
            m = PartitionAndReorderObjects(tsi, tei);

Intersect(rsi, rei, tsi, m);
            Intersect(rsi, rei, m, tei);
         }
      }
   }
}
```

FIG. 6

EFFICIENT RAY TRACING WITHOUT ACCELERATION DATA STRUCTURE

CROSS REFERENCE TO RELATED APPLICATIONS

The present application claims the priority benefit of U.S. Provisional Patent Application Ser. No. 61/057,168, filed on May 29, 2008.

The present application is a continuation-in-part of U.S. patent application Ser. No. 12/245,763, filed on Oct. 5, 2008, which claims priority from U.S. Provisional Patent Application Ser. No. 60/977,603, filed on Oct. 4, 2007.

U.S. patent application Ser. No. 12/245,763 is a Continuation-in-Part of U.S. patent application Ser. No. 11/474,517, filed Jun. 23, 2006, which claims the benefit of U.S. Provisional Patent App. Ser. No. 60/693,231 filed Jun. 23, 2005, and which is also a Continuation-in-Part of U.S. patent application Ser. No. 10/299,574, filed Nov. 19, 2002.

U.S. patent application Ser. No. 10/299,574 is a Continuation-in-Part of U.S. Ser. No. 09/884,861, filed Jun. 19, 2001, which claims priority benefit from U.S. Provisional Patent App. Ser. No. 60/265,934, filed Feb. 1, 2001, and 60/212,286 filed Jun. 19, 2000.

Each of the above-listed patent applications, including, but not limited to, as well as their provisional counterparts, is incorporated by reference herein in its entirety as if set forth in its entirety herein.

FIELD OF THE INVENTION

The present invention relates generally to methods and systems for image rendering in and by digital computing systems, such as computer graphics methods and systems for motion pictures and other applications, and in particular, relates to methods, systems, devices, and computer software for enabling quasi-Monte Carlo (QMC) radiation transport simulation by efficient ray tracing.

Additional Documents Incorporated Herein by Reference

Each of the following is incorporated herein by reference as if set forth herein in its entirety:

U.S. and PCT Patent Application Ser. Nos. 60/693,231, 11/474,517 and PCT/US2006/0024631 filed Jun. 23, 2005 (provisional application) and Jun. 23, 2006 (U.S. and PCT utility applications) respectively, and entitled "Real-Time Precision Ray Tracing."

U.S. and PCT patent application Ser. Nos. 11/474,091 and PCT/US2006/0024820, both filed Jun. 23, 2006 and entitled "Image Synthesis by Rank-1 Lattices."

U.S. and PCT patent application Ser. Nos. 11/465,717 and PCT/US2006/0032393, both filed Aug. 18, 2006 and entitled "Image Synthesis Methods and Systems."

U.S. Provisional Patent Application Ser. No. 60/793,063 filed Apr. 19, 2006, entitled "Real-Time Precision Ray Tracing".

U.S. Patent Application Ser. Nos. 60/886,197 and 12/018,733 filed Jan. 23, 2007 and Jan. 23, 2008, respectively, entitled "Terminating Spatial Partition Hierarchies by A Priori Bounding Memory."

U.S. Provisional Patent Application Ser. No. 60/977,603, filed Oct. 4, 2007, entitled "Quasi-Monte Carlo Light Transport Simulation by Efficient Ray Tracing."

U.S. patent application Ser. No. 10/299,958 filed Nov. 19, 2002, entitled "System and Computer-Implemented Method for Evaluating Integrals Using a Quasi-Monte Carlo Methodology in Which Sample Points Represent Dependent Samples Generated Using a Low-Discrepancy Sequence."

U.S. patent application Ser. No. 11/619,275 filed Jan. 3, 2007 entitled "Computer Graphics Methods and Systems Using Quasi-Monte Carlo Methodology."

U.S. patent application Ser. No. 10/439,311 filed May 15, 2003, entitled "System and Computer-Implemented Method for Evaluating Integrals Using Stratification by Rank-1 Lattices."

U.S. patent application Ser. No. 08/880,418 filed Jun. 23, 1997, now U.S. Pat. No. 6,529,193, entitled "System and Method for Generating Pixel Values for Pixels in an Image Using Strictly Deterministic Methodologies for Generating Sample Points."

Also incorporated by reference herein as if set forth in their entireties are the following:

J. Bittner and V. Havran, *RDH: Ray Distribution Heuristics for Construction of Spatial Data Structures*, Poster at the IEEE/EG Symposium on Interactive Ray Tracing, 2007.

K. Dmitriev, V. Havran, and H.-P. Seidel, *Faster Ray Tracing with SIMD Shaft Culling*, Tech. Report MPI-I-20044-006, Max-Planck-Institut fur Informatik, December 2004.

H. Dammertz and A. Keller, *Improving Ray Tracing Precision by World Space Intersection Computation*, Proc. 2006 IEEE Symposium on Interactive Ray Tracing, September 2006, pp. 25-32.

A. Fournier and P. Poulin, *A Ray Tracing Accelerator Based on a Hierarchy of ID Sorted Lists*, Proc. Graphics interface, 1993, pp. 53-61.

A. Glassner, *An Introduction to Ray Tracing*, Academic Press, 1989.

A. Glassner, *Principles of Digital Image Syithesis*, Morgan Kaufmann, 1995.

J. Goldsmith and J. Salmon, *Automatic Creation of Object Hierarchies for Ray Tracing*, IEEE Computer Graphics & Applications (1987), no. 5, 14-20.

E. Haines and J. Wallace, *Shaft Culling for Efficient Ray-Traced Radiosity*, Photorealistic Rendering in Computer Graphics (Proc. 2nd Eurographics Workshop on Rendering) (P. Brunet and F. Jansen, eds.), Springer, 1994.

T. Kato and J. Saito, *"Kilauea" Parallel Global Illumination Renderer*, Fourth Eurographics Workshop on Parallel Graphics and Visualization, 2002, pp. 7-13.

H. Niederreiter, *Random Number Generation and Quasi-Monte Carlo Methods*, SIAM, Philadelphia, 1992.

U. Ochsenfahrt and R. Salomon, *CREMA: A Parallel Hardware Raytracing Machine*, ISCAS 2007. IEEE International Symposium on Circuits and Systems, 2007, pp. 769-772.

M. Quinn, *Parallel Programming in C with MPI and OpenMP*, McGraw-Hill, 2003.

P. Shirley, *Realistic Ray Tracing*, A K Peters, Ltd., 2000.

M. Shevtsov, A. Soupikov, and A. Kapustin, *Highly Parallel Fast KD-tree Construction for Interactive Ray Tracing of Dynamic Scenes*, Computer Graphics Forum (Proc. Eurographics 2007) 26, 2007, no. 3, pp. 395-404.

M. Ullner, *Parallel Machines for Computer Graphics*, Ph.D. thesis, Cal-Tech, 1983.

E. Veach, *Robust Monte Carlo Methods for Light Transport Simulation*, Ph.D. thesis, Stanford University, 1997.

C. Wächter, *Quasi-Montle Carlo Light Transport Simulation by Efficient Ray Tracing*, Ph.D. thesis, Universitat Ulm, 2008.

I. Wald, *Realtime Ray Tracing and Interactive Global Illumination*, Ph.D. thesis, Saarland University, 2004.

I. Wald, S. Boulos, and P. Shirley, *Ray Tracing Deformable Scenes using Dynamic Bounding Volume Hierarchies*, ACM Transactions on Graphics 26, 2006, no. 1.

J.-M. Wierum, *Logarithmic Path-Length in Space-Filling Curves*, 14th Canadian Conference on Computational Geometry, Lethbridge, 2002.

C. Wächter and A. Keller, *Instant ray tracing: The bounding interval hierarchy*, Rendering Techniques 2006 (Proc. 17th Eurographics Symposium on Rendering), 2006, pp. 139-149.

C. Wächter and A. Keller, *Efficient Simultaneous Simulation of Markov Chains*, Monte Carlo and Quasi-Monte Carlo Methods 2007 (A. Keller, S. Heinrich, and H. Niederreiter, eds.), Springer, 2007, pp. 669-684.

C. Wächter and A. Keller, *Terminating Spatial Partition Hierarchies by A Priori Bounding Memory*, Proc. 2007 IEEE/EG Symposium on Interactive Ray Tracing, 2007, pp. 41-46.

I. Wald, W. Mark, J. Günther, S. Boulos, T. Ize, W. Hunt, S. Parker, and P. Shirley, *State of the Art in Ray Tracing Animated Scenes*, Eurographics 2007 State of the Art Reports, 2007.

K. Zhou, Q. Hou, R. Wang, and B. Guo, *Real-Time KD-Tree Construction on Graphics Hardware*, ACM Trans. on Graphics 2008, art.-no. 126.

BACKGROUND OF THE INVENTION

The term "ray tracing" describes a technique for synthesizing photorealistic images by identifying all light paths that connect light sources with cameras and summing up these contributions. The simulation traces rays along the line of sight to determine visibility, and traces rays from the light sources in order to determine illumination.

Ray tracing has become mainstream in motion pictures and other applications. However, current ray tracing techniques suffer from a number of known limitations and weaknesses, including numerical problems, limited capabilities for processing dynamic scenes, slow setup of acceleration data structures, and large memory footprints. Thus, current ray tracing techniques lack the capability to deal efficiently with fully animated scenes, such as wind blowing through a forest or a person's hair. Overcoming the limitations of current ray tracing systems would also enable the rendering of, for example, higher quality motion blur in movie productions.

Current attempts to improve the performance of ray tracing systems have fallen short for a number of reasons. For example, current real-time ray tracing systems generally use 3D-trees as their acceleration structure, which are based on axis-aligned binary space partitions. Because the main focus of these systems is on rendering static scenes, they typically fail to address the significant amount of setup time required to construct the required data structures in connection with fully animated scenes.

Along these lines, one known approach seeks to build efficient 3D-trees and develop a technique able to shorten the time needed to traverse the tree. However, it can be shown that in common situations the expected memory requirement for the system increases quadratically with an increase in the number of objects to be ray-traced.

It would be desirable to provide improved and more efficient methods, systems, apparatus, devices and software program/code products relating to ray tracing.

More particularly, photorealistic image synthesis can be described by a path integral. This integral is numerically approximated by summing up contributions of transport paths that connect light sources and sensors, e.g., a camera, a human eye, or the like. The paths are trajectories of Markov processes, the edges of which are straight lines along rays of light and the vertices of which are light-scattering events.

Accordingly, it would be desirable to provide methods, systems, apparatus, devices and software program/code products that can accelerate the simulation of light transport, provide techniques and data structures to efficiently trace rays, and allow the better approximation of the distribution of light by using quasi-Monte Carlo techniques to simultaneously simulate an ensemble of paths instead of single trajectories. The present invention, as discussed in detail below, provides such methods, structures, techniques, processes, and technical advantages. The invention, as described below has applications not only in computer graphics, but also in other areas of computer science, mathematics, simulation, and other fields.

SUMMARY OF THE INVENTION

The invention provides systems, devices, methods and computer program code (software) products for, among other aspects and possible applications, enabling computer graphics systems to accurately and efficiently render images. Systems, devices, methods and computer program code (software) products in accordance with the invention are suitable for implementation or execution in, or in conjunction with, a computer graphics system including a computer for rendering images for storage or for display, such as on a display element, wherein the rendering of an image includes utilizing the computer and/or other elements of the computer graphics system to generate pixel values corresponding to pixels in an image representation. Systems, devices, methods and computer program code (software) products in accordance with the present invention are suitable for implementation or execution in, or in conjunction with, a wide range of commercially available computer graphics systems or software environments, such as those available from NVIDIA CORPORATION of Santa Clara, Calif.

One aspect of the present invention relates to methods, systems and computer program code (software) products executable in a digital processor operable to simulate light transport in a scene by ray tracing, wherein the digital processor is operable to maintain an object list representing a list of objects associated with a boundary of the scene, wherein the methods, systems and computer program code (software) products include executing a ray tracing method that traces r rays through n objects by (1) partitioning the object list in a recursive manner to generate partitions and (2) culling away the partitions of objects from rays, without using an explicit auxiliary acceleration data structure, and wherein one or more of the following are provided or enabled: (a) permutations of rays and objects are storable as index arrays, (b) a ray permutation is utilizable, following the recursive partitioning and culling of partitions of objects, to enumerate ray-object intersections by spatial proximity in a manner adapted for Markov chain simulation, which can comprise executing shading and scattering computations or employing a path tracing technique, and/or (c) an order of recursion is determinable by a majority of ray directions of rays associated with the scene.

In another aspect of the present invention, accelerating object list partitioning or ray classification are provided by utilizing a construct representing a plurality of objects instead of treating objects separately, or by tracing a plurality of rays instead of one.

In another aspect of the invention, a spatial hierarchy is implicitly determined by recursion, and the spatial hierarchy determined by recursion is explicitly stored for reuse.

Another aspect of the invention includes generating geometry or rays on demand based on identification information.

Yet another aspect of the invention includes streaming massive geometry in chunks, wherein chunks are processed utilizing any of the recursion and culling noted above.

Another aspect of the invention includes partitioning object space or partitioning a ray space (hierarchically or otherwise) to efficiently stream massive geometry.

Still another aspect of the invention includes checking n objects for intersection by (1) partitioning the object list in a recursive manner to generate partitions and (2) culling away the partitions of objects from other objects, without employing an explicit auxiliary acceleration data structure.

Another aspect of the invention includes partitioning object space or partitioning a ray space.

Another aspect of the invention includes utilizing a scene graph.

In another aspect of the invention, the accelerating includes executing a computation by bucket sorting objects in object space or rays in ray space.

In still another aspect of the invention, the accelerating includes recursively clustering m subsequent objects.

Yet another aspect of the invention includes executing a collision detection technique comprising checking n objects for intersection, wherein the checking of n objects for intersection includes employing a spatial partition technique that recursively partitions space, without using an explicit auxiliary acceleration data structure.

These and other aspects, examples, embodiments and practices of the invention, whether in the form of methods, devices, systems or computer software code products (software), will be discussed in greater detail below in the following Detailed Description of the Invention and in connection with the attached drawing figures.

DETAILED DESCRIPTION OF THE INVENTION

1. Overview:

A known principle of accelerated ray tracing is to construct a spatial hierarchy that allows one to cull parts of space that are not intersected by a ray, thus effectively reducing the overall amount of object intersections per ray. Typically this hierarchy is stored explicitly and its elements are enumerated along ray direction in order to efficiently trace a ray. However, the Applicant has discovered that foregoing this kind of ordered traversal enables ray tracing in the style of a depth-buffer technique: the hierarchy does not need to be stored explicitly and even massive or procedurally generated geometry can be streamed. As a side benefit, the method approximately sorts computed intersections by spatial proximity, which is consistent with other recent findings by the inventors regarding the simultaneous simulation of Markov chains, i.e., variance reduction and shading coherency is implicit.

2. Introduction

Ray tracing is a versatile tool for enabling bidirectional path tracing techniques, where in order to simulate transport, paths of particles that connect sources and sinks are sampled. Examples of known ray tracing techniques are disclosed in the art.

While bidirectional path tracing is becoming a principal tool in the computational sciences, the most prominent application still is the synthesis of photorealistic images by simulating light transport. Photorealistic image synthesis consists of finding all light transport paths that connect the camera and light sources and summing up their contributions. Such paths are determined by vertices that are connected by straight line segments. Their construction is based on either tracing particles along straight lines until the boundary is hit or checking the mutual visibility of two vertices in order to connect them.

These ray tracing operations are prominent in such simulation techniques and therefore need to be well accelerated. Fast ray tracing implementations usually construct an auxiliary data structure that allows one to efficiently cull large parts of the boundary representation in order to find the first intersection. Such acceleration data structures have a considerable memory footprint and require quite subtle memory management. Preprocessing times and update times are not negligible and a scalable parallelization is difficult.

Motivated by the inherent sequential nature of path tracing techniques, i.e., one vertex must be created after another by simulating a Markov process, the simultaneous simulation of multiple Markov chains is considered. Instead of tracing single paths, this approach implies the tracing of each generation of rays, one after another. There is therefore described herein a hierarchical procedure for accelerated ray tracing that directly operates on all rays of the same generation. It does not explicitly store an auxiliary data structure and therefore allows one to efficiently ray trace fully dynamic boundary representations. The approach can be generalized for streaming of massive geometry. The described scheme improves over the previous state of the art in accelerated ray tracing by both memory footprint and capability.

3. Overall Approach

The concept behind the approach used in the present invention is as follows. Instead of only sorting objects into a hierarchy during the setup preprocessing phase, all rays are simultaneously sorted into the same hierarchy. The construction of a hierarchy is thus merged with the ray traversal of the hierarchy itself.

Figure 1:
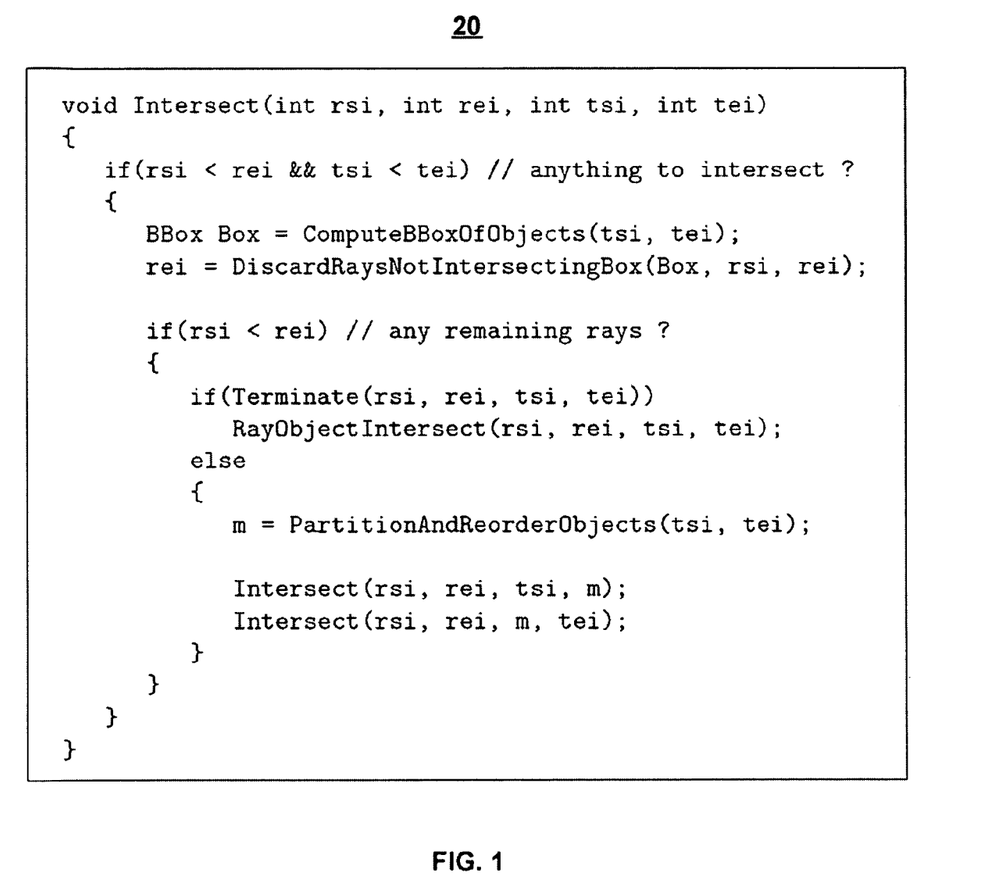
FIG. 1 is a pseudocode listing of an illustrative example of a procedure in accordance with aspects of the present invention.

Aspects of the present invention may be understood with respect to formulation as a recursive procedure. FIG. 1 is a pseudocode listing 20 of an illustrative example of such a formulation in a procedure that intersects the rays from start index rsi through end index rei with the objects (e.g., triangles) from tsi through tei.

Figure 2A:
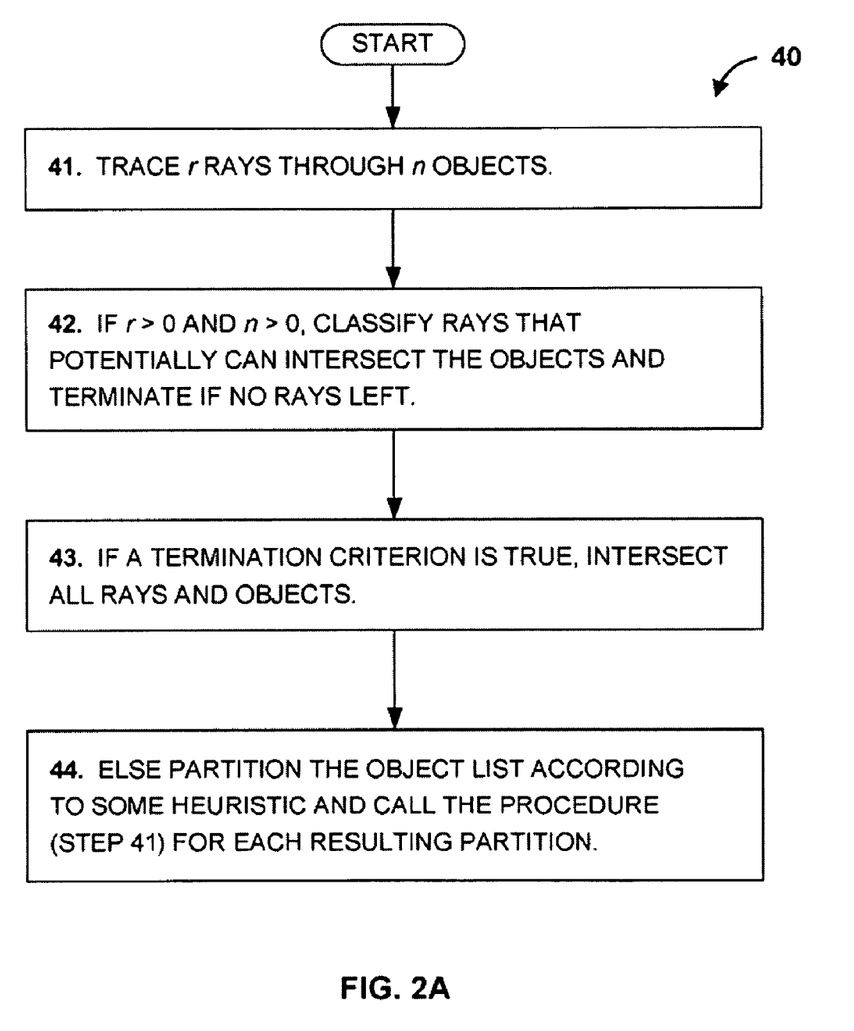
FIGS. 2A-C are flowcharts of method aspects in accordance with an exemplary of the present invention.
Figure 2B:
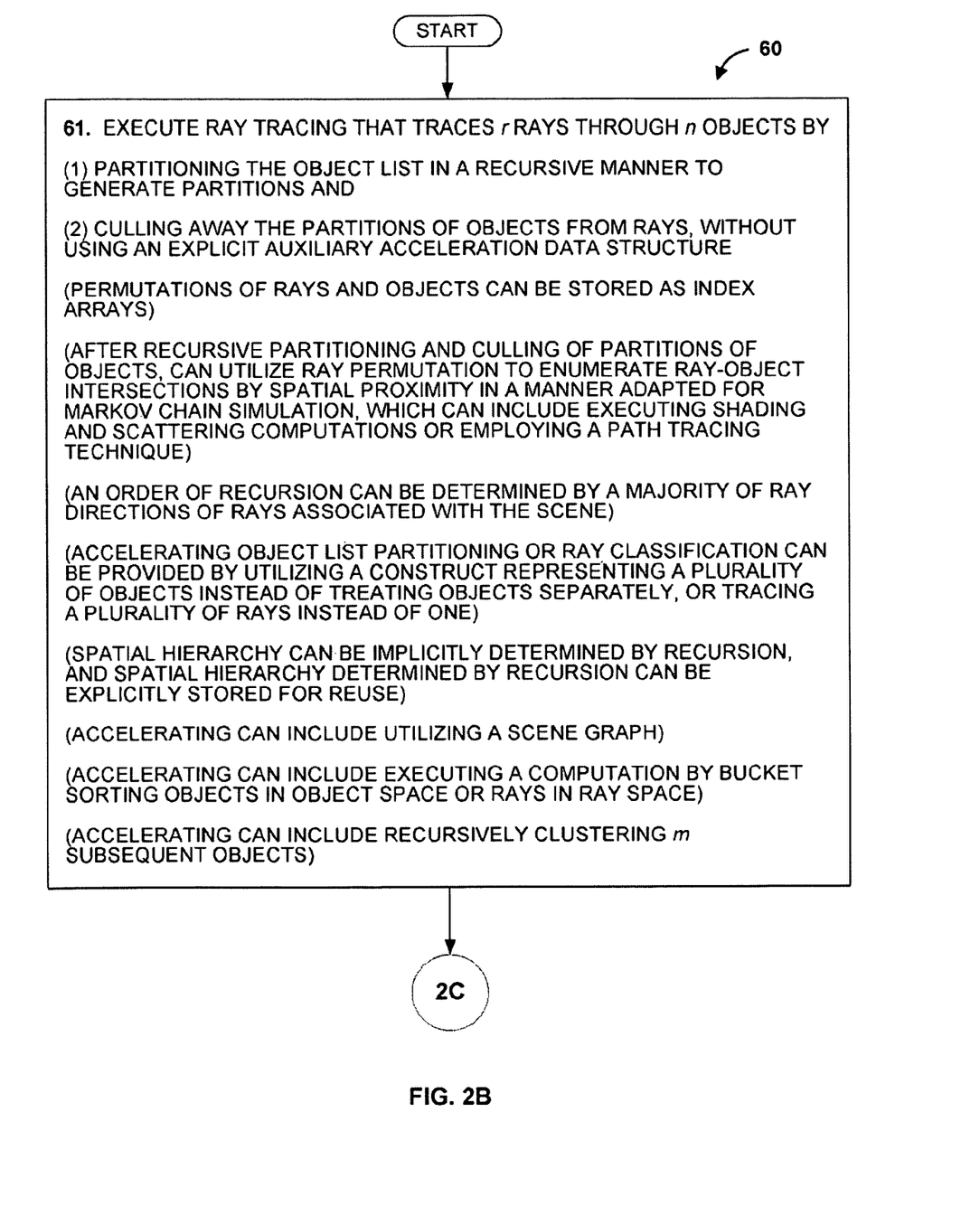
Figure 2C:
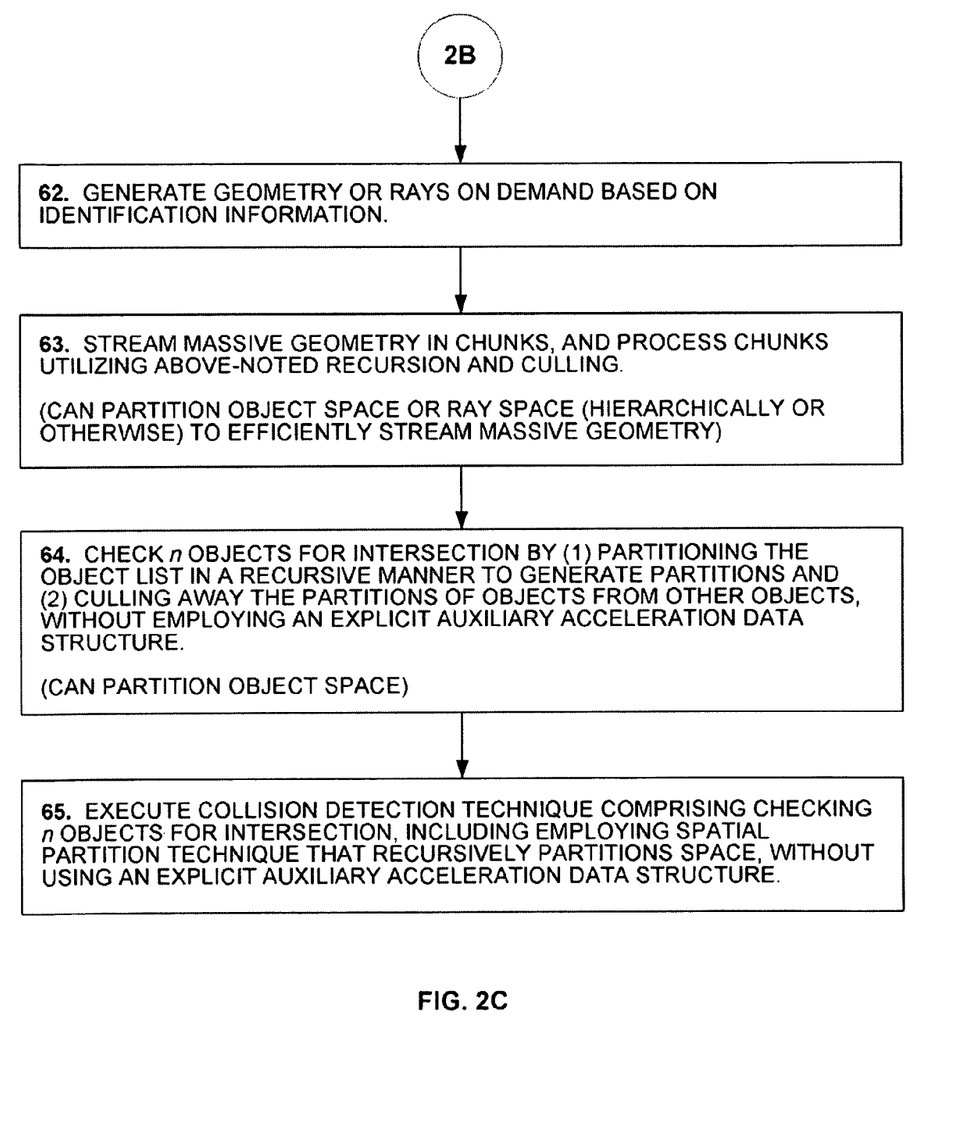

FIGS. 2A-2C are flowcharts 40 (FIG. 2A) and 60 (FIGS. 2B-C) of method aspects in accordance with an exemplary practice of the present invention. It will be appreciated that flowcharts 40 and 60 are intended to be illustrative, rather than limiting. In particular, it should be noted that some or all of the listed method components may, within the scope and spirit of the present invention, be ordered differently, combined with each other or with other non-listed components, or broken down into subcomponents. In addition, not all noted components need be executed.

The FIG. 2A flowchart 40 includes the following components:

Box 41: Tracer rays through n objects.

Box 42: If r>0 and n>0, classify rays that potentially can intersect the objects and terminate if no rays left.

Box 43: If a termination criterion is true, intersect all rays and objects.

Box 44: Else partition the object list according to some heuristic and call the procedure (step 41) for each resulting partition.

The flowchart 60 shown in FIGS. 2B-2C includes the following components:

Box 61: Execute ray tracing that traces r rays through n objects by
(1) partitioning the object list in a recursive manner to generate partitions; and
(2) culling away the partitions of objects from rays, without using an explicit auxiliary acceleration data structure.

As further shown in FIG. 2B, Box 61 may include one or more of the following subcomponents:

Permutations of rays and objects can be stored as index arrays.

After recursive partitioning and culling of partitions of objects, can utilize ray permutation to enumerate ray-object intersections by spatial proximity in a manner adapted for Markov chain simulation, which can include executing shading and scattering computations or employing a path tracing technique.

An order of recursion can be determined by a majority of ray directions of rays associated with the scene.

Accelerating object list partitioning or ray classification can be provided by utilizing a construct representing a plurality of objects instead of treating objects separately, or tracing a plurality of rays instead of one.

Spatial hierarchy can be implicitly determined by recursion, and spatial hierarchy determined by recursion can be explicitly stored for reuse.

Accelerating can include utilizing a scene graph.

Accelerating can include executing a computation by bucket sorting objects in object space or rays in ray space.

Accelerating can include recursively clustering m subsequent objects.

Box 62: Generate geometry or rays on demand based on identification information.

Box 63: Stream massive geometry in chunks, and process chunks utilizing above-noted recursion and culling.

As shown in FIG. 2C, Box 63 may include the following subcomponent:

Can partition object space or ray space (hierarchically or otherwise) to efficiently stream massive geometry.

Box 64: Check n objects for intersection by (1) partitioning the object list in a recursive manner to generate partitions and (2) culling away the partitions of objects from other objects, without employing an explicit auxiliary acceleration data structure.

As shown in FIG. 2C, Box 63 may include the following subcomponent:

Can partition object space.

Box 65: Execute collision detection technique comprising checking n objects for intersection, including employing spatial partition technique that recursively partitions space, without using an explicit auxiliary acceleration data structure.

The techniques illustrated in FIGS. 1 and 2A-2C are described in further detail below.

3.0.1 Ray Classification

After checking whether there are still rays and objects to intersect, all rays not intersecting the axis-aligned bounding box of the objects are discarded. In case no rays remain, the recursion is terminated 3.0.2 Intersection Upon a suitable termination criterion, n:=tei−tsi objects (e.g., triangles) must be intersected with r:=rei−rsi rays. If the number of rays is sufficiently large, it can pay off to intersect multiple rays with a triangle or vice versa, optionally using SIMD instructions. The compact vertex-index representation does not cause a notable penalty, which indicates that unpacking compressed boundary representations can be beneficial with respect to memory latency.

The termination criterion can be as simple as checking for thresholds on the number of rays and triangles to be intersected. Since at this point in the technique all information about geometry and active rays is present, other situations where a further recursion is not possible or does not pay off can additionally be considered for termination.

3.0.3 Object Classification

For the purposes of examples in this discussion, an approximate Surface Area Heuristic (SAH) is used to determine how to partition the object list. Other heuristics, such as, e.g., the global heuristic or simply splitting along the longest side of the object bounding box in the middle can be used as well. Given the fact that the complete set of rays and objects to be intersected are known, even better partitioning heuristics are becoming feasible now that one can take advantage of the actual ray distribution instead of always assuming a uniform ray distribution, which is for example necessary to formulate the SAH. Alternatively, it is also possible to partition space, which will be discussed below.

3.0.4 Recursion

For each resulting class, the procedure is called recursively, i.e., in a recursive manner.

The simplest implementation of this technique is already competitive with classic approaches; however, there is no need to store or manage the acceleration data structure explicitly. In fact the call tree represents the hierarchy that usually must be stored in memory and the call stack traces the current path through the call graph.

Contrary to previous approaches the technique gives up on enumerating voxels along ray direction for each individual ray. Resembling collision detection techniques, space is subdivided adaptively to find regions where rays and geometry actually intersect in order to shorten ray segments. As a consequence and similar to a depth-buffer, the performance depends to a certain extend on the order of the objects passed to the technique.

In practice the ray classification and object classification step can be linked much more closely, as, e.g., the partitioning already can provide the bounding boxes and ray classification would just precede each recursive call. Many variations and extension of this basic technique are possible, and some are discussed below.

3.1 More Speed

The performance of the basic technique can be optimized in various ways. The following are some examples.

3.1.1 Ray Direction Democracy

Although the present invention forgoes a classic practice of traversing nodes of a hierarchy along ray direction, this order can be partially preserved: The order in which the recursive calls are issued is decided by the main direction determined by the majority of rays. Thus, performance can be significantly improved, and contrary to a plain depth-buffer, depends much less on the order of objects. This scheme can be best suited for rays that emerge from a single source, like the camera or lights in the scene, but even other second generation rays like reflection and refraction rays can profit from this scheme unless the ray direction distribution happens to be completely uniform. This can be the case, for example, after a certain number of bounces in a complex scene.

3.1.2 Exploiting Structured Input

Discarding rays and reordering the objects can be the most computationally expensive operations of the method. However, processing time and memory accesses can be efficiently reduced if some structure on the input data, i.e., the rays and/or the geometry, is known.

3.1.2.1 Structured Rays

The method described herein can also utilize and benefit from the considerable amount of research on tracing ensembles of rays. For example, a given shaft structure on the rays can make the ray classification step much more efficient.

Beneficial configurations include primary rays, shadow rays or sampling the hemisphere. However, the number of such useful configurations is limited, since, except for parallel rays, rays in general are divergent over distance. Efficiently determining exploitable structure in secondary rays is still considered a somewhat open problem.

Seen this way, rasterization can be considered a particular application of the present invention. Similar to a hierarchical depth-buffer, the pixel layout lends itself to hierarchically subdividing the set of rays into shafts, which then can be used for an efficient ray classification. As discussed above, hierarchical occlusion culling is intrinsic if ray direction democracy is employed.

3.1.2.2 Structured Geometry

An obvious way to increase classification performance is to classify one container of objects instead of looping over the included single objects. If this container cannot be uniquely classified, it has to be unpacked on demand. This concept can be readily realized by bounding boxes standing in for the set of objects or procedural geometry they enclose.

A hierarchy of such bounding boxes can be provided by an existing scene graph, computed in advance by bucket sorting, or by recursively clustering m subsequent objects, which however demands some kind of locality of the underlying geometry. For example, the objects at the leaves of a balanced m-ary bounding volume hierarchy enumerated in in-order would expose such locality.

3.1.3 Caching the Hierarchy

It is possible that caching the implicit hierarchy explicitly will accelerate the tracing of next generation rays. While this is generally true for simple scenes, it comes at the additional cost of storing the auxiliary acceleration data structure. The actual implementation, for example in software, only requires some additional lines of code that manage a tree represented as an array sized by the number of triangles, which stores the splitting indices of the triangle array and a reference to the two children. The actual efficiency very much depends on how different the paths of the rays are from generation to generation.

3.1.4 On-Demand Generation of Rays and Geometry

Since rays and objects are accessed by indices, it is not necessary to load or generate either of them as long as they are uniquely identified by their index, i.e., can be computed on demand.

One illustrative example is the high precision ray tracing using object space intersection computation: Objects are subdivided on demand only where rays go. Instead of subdividing on a per ray basis, subdivision computations are shared over many rays.

3.2 Massive Geometry

In production rendering, geometry often is too large to fit into main memory and a streaming ray tracer is desirable. However, since most parts of the geometry are generated on demand and access is rather sequential, the geometry cannot be used to efficiently guide object classification and performance will be compromised.

3.2.1 Streaming Chunks of Geometry

It is straightforward to stream in the geometry in chunks as large as available memory permits. Then the recursion will not be as deep as before, but repeated for any chunk of geometry. The smaller the chunks become, the more performance will be compromised, because the implicit hierarchy is becoming less and less useful.

3.2.2 Spatial Partitioning

A different solution is to store a tree that hierarchically subdivides space and in each leaf stores the rays intersecting the corresponding voxel. Geometric objects then traverse the tree and ray object intersections are performed for the rays in the leaves that are intersected by the geometry. As discussed above, the order in which the tree is traversed can be determined by storing the nodes in the order given by ray democracy.

Such an approach is relatively straightforward as well, but has some intrinsic issues that need to be addressed. Since spatial subdivision is not guided by the objects, with high probability objects overlap voxel boundaries and thus can encounter many intersection operations with the same ray. This is easily optimized by storing or hashing the object identification with every ray, so-called "mailboxes" that come at the price of a drastically increased per-ray memory usage.

A second issue is that a bounding box of the geometry needs to be known beforehand in order to subdivide space. Of course this can be computed by streaming the data set once. However, similar to estimated bounding boxes for displaced geometry in REYES or MENTAL RAY products, it is also a valid option to require the user to provide a conservative estimate.

The memory footprint and management of the hierarchy pose a more difficult problem. Given a grid of r×r parallel rays originating on one side of the scene bounding box, the resulting hierarchy would be a regular grid with $r^3$ voxels. During streaming, some ray segments will be cut by intersecting geometry, which results in the necessity to verify for each ray whether it is still long enough to actually intersect the current voxel. For efficiency reasons rays that have become too short to reach a certain voxel should not be referenced therein any longer, which is a costly bookkeeping operation.

An approach to ameliorate these problems is to build the hierarchy on demand, meaning that leaf voxels of the hierarchy are not subdivided unless a sufficient number of objects have been processed within. Thus, there is a certain hope that ray segments are shortened before subdivision and consequently need to be stored in a smaller number of voxels.

Managing a predetermined memory block for the hierarchy can be done such that each branch of the hierarchy receives a fraction of memory proportional to the number of rays that it contains.

The efficiency of this approach can benefit from any known structure on rays and/or geometry in a manner analogous to that described above regarding exploiting structured input.

3.3 Spatial Coherency for Free

Instead of swapping rays or objects during the classification phases of the technique, memory bandwidth can be reduced by swapping indices in index permutations stored as arrays.

This approach is straightforward; however, it is of interest to examine the permutations after the completion of the hierarchical intersection technique illustrated in the FIG. 1 pseudocode listing 20: The index array for the rays represents a permutation that enumerates the rays according to spatial proximity, as the basic technique hierarchically subdivides the object list while sorting objects by spatial proximity. The spatial coherency of shading operations can be visualized using a "false color" image, in which a similar color indicates spatial coherency.

For the streaming variant of the method aspect discussed in a previous Section, this permutation is simple to retrieve by an in-order traversal of the octree, where rays in leaves are enumerated only if their point of intersection resides in the leaf voxel currently under consideration. This can approximate a z-curve enumeration of the intersection points for certain hierarchies.

3.3.1 Simultaneous Simulation of Markov Chains

In commonly owned U.S. patent application Ser. No. 12/018,733 and subsequent publication by the inventors, a simple technique for the simulation of Markov chains is introduced and analyzed. Instead of generating one trajectory after another, a multitude of trajectories is generated simultaneously, however, one generation after another. In combination with a spatial sorting scheme this allows to benefit from the local properties of (t, s)-sequences and certain rank-1 lattice sequences.

With the overall method of the present invention, some previous sorting approaches are dispensable and the simulation becomes more efficient, because the resulting permuted ray list (see previous Section) enumerates intersection points by proximity just as required.

Note that large objects that can be harmful to object list partitioning can be harmful here, too. Since the intersections are ordered by an object list partitioning only, many intersections residing on a single object need to be ordered separately. The same can be true for using the spatial hierarchy discussed in a previous section.

3.3.1.1 Path Tracing

Path Tracing is one example of a rendering technique that can be realized with the techniques discussed above. The first generation of rays corresponds to the primary rays starting from the camera through each pixel. These rays are traced using the technique illustrated in the FIG. 1 pseudocode listing 20, and the resulting intersection points are shaded by tracing an ensemble of shadow rays. The shading result is added to the pixel associated with each path. The next generation of rays is determined using various methods, with the order of intersections as discussed in the previous section. Shading and scattering then are repeated until termination to generate the Markov chains.

Since shadow rays can be terminated upon any intersection, the ray classification step is likely to be more efficient as compared to finding the first intersection, as the exact order in which individual rays are traversed is of reduced importance.

3.3.1.2 Coherent Shading

Known forms of Graphical Processing Units (GPUs) are highly optimized to perform shading operations. Such a GPU can simultaneously perform deferred shading on previous intersections, accumulating the results, and generating the next generation rays. Additionally, GPU texture caches can work well in implementing the present invention, since the method of the present invention determines intersections ordered by spatial coherency.

3.3.1.3 Ambient Occlusion and Direct Illumination

Techniques of ambient occlusion and direct illumination, in connection with rasterization, would be a typical application for the present invention. First the GPU is used to rasterize geometry determining the points to be shaded. Then all ambient occlusion and shadow rays are processed by the technique illustrated in the FIG. 1 pseudocode listing 20. As with classic multi-pass techniques, the geometry would typically need to be streamed twice; however, no additional memory would be necessary.

3.4 Complexity

The parallel complexity of tracing r rays through n triangles is o(1), with a latency of $\lceil \log_2 n \rceil$. A parallel hardware architecture operable to obtain this perfect lower bound for each ray consists of n ray-triangle-intersection processors followed by a hierarchical reduction stage to find the closest intersection. The required integrated circuit chip area is proportional to r×n, which is typically out of reach in almost all practical cases.

Often, ray tracing is considered a searching problem, and in fact many implementations are based on backtracking with a worst case complexity linear in the number n of objects.

For the technique illustrated by the FIG. 1 pseudocode listing 20, the complexity analysis of the quicksort technique applies, and thus it is expected to run in o(n log n) with a worst case complexity of o(n²). Its spatial complexity is just o(n+r), where r is the number of rays. This outperforms all previous approaches of accelerated ray tracing.

3.4.1 Scalable Parallelization

The method of the present invention can be parallelized in a straightforward way using known techniques. In accordance with such known parallelization techniques, geometry that does not fit into the memory of one machine can be partitioned over multiple machines, where each machine deals with the same set of rays. The final result for each ray is found by a reduction operation. If even more machines are available, the set of rays also can be processed in parallel by distributing it over the processor cluster. This parallelization scheme is scalable and only introduces a latency that is logarithmic in the number of disjoint partitions of the geometry.

3.5 Classification by Spatial Partitioning

The approach presented above in Section 3 relies principally on partitioning the list of objects to be ray traced. One alternative to using spatial partitioning for the rays is discussed above in connection with massive geometry.

Yet another variation of the method of the present invention is introduced, which uses spatial partitioning for both rays and objects. This variant is as follows:

A. Check whether there is at least one ray to trace through at least one object.
  B. Check a recursion termination criterion. In case termination is indicated, all rays are intersected with all objects, thereby recording the closest intersections for each of the rays.
  C. Using a heuristic, partition the current bounding volume. Such heuristics can be as simple as splitting an axis-aligned bounding box along its longest side in the middle, or one can utilize more complicated schemes such as the SAH.
  D. For all resulting partitions, determine both the rays and objects that intersect each partition and recursively call the routine (i.e., step A) with the set of rays and objects determined/classified for each partition.

Typically the routine would be started with the bounding box of the scene. Many improvements developed for ray tracing can also be applied. These can include, as a particular example, the above-discussed ray direction democracy strategy, which will shorten rays efficiently by sorting the partitions according to ray directions.

With spatial partitioning, large objects typically present no issues, but as they become split, however, they can be intersected multiple times as they can belong to more than one partition. Those skilled in this area of technology will understand that a number of techniques can be used to avoid multiple intersection, such as by mailboxing mechanisms or by removing already intersected objects or rays from other partitions.

4. Collision Detection

The technique presented in FIG. 1 easily can be modified to perform collision detection:

Instead of passing rays and object list as arguments, the object list is passed twice as an argument. Instead of discarding rays, objects from the first list that are not intersecting the bounding box of the second list of objects are discarded. When the termination criterion returns TRUE, all objects from both lists are intersected against each other. The partitioning part and the recursion remain untouched.

Similar to the ray tracing variant of the technique, any structure on the objects can be used to speed up rejection and classification. Unlike the classic approach of intersecting a bounding volume hierarchy with itself, for example, this practice of the present invention implicitly builds this hierarchy on the fly and does not need to store it.

It will also be understood by those skilled in the relevant technology that the implementer can also readily use the space partitioning techniques discussed above as an alternative to, or adjunct to, object list partitioning.

5. Digital Processing Environments in which Invention can be Implemented

Having described examples and embodiments of the invention above, the following is a discussion, to be read in connection with FIGS. 3-6, of underlying digital processing structures and environments in which the invention may be implemented and practiced. It will be understood by those skilled in the art that the present invention provides methods, systems, devices and computer program products that enable more efficient activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of the computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More particularly, those skilled in the art will understand that the present invention can be utilized in the generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The detailed description herein illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. See, for example, FIGS. 3 and 4. The various processing aspects and means described herein may therefore be implemented in the software and/or hardware elements of a properly configured digital processing device or network of devices. Processing may be performed sequentially or in parallel, and may be implemented using special purpose or re-configurable hardware.

Figure 3:
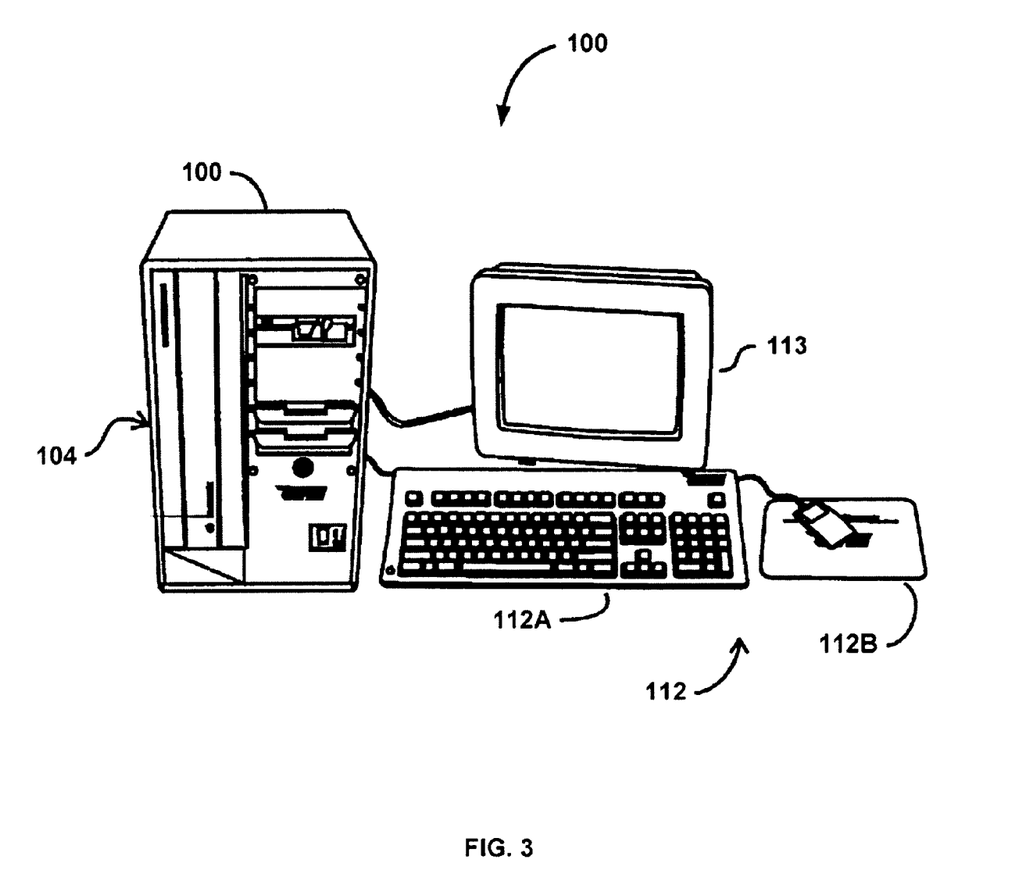
FIGS. 3-6 are a series of diagrams illustrating exemplary digital environments in which aspects of the present invention may be practiced.

As an example, FIG. 3 attached hereto depicts an illustrative computer system 100 that can carry out such computer graphics processes. With reference to FIG. 3, the computer system 100 in one embodiment includes a processor module 101 and operator interface elements 102 comprising operator input components such as a keyboard and/or a mouse (or digitizing tablet or other analogous element(s), generally identified as operator input element(s)) and an operator output element such as a video display device. The illustrative computer system 100 can be of a conventional stored-program computer architecture. The processor module can include, for example, one or more processor, memory and mass storage devices, such as disk and/or tape storage elements (not separately shown), which perform processing and storage operations in connection with digital data provided thereto. The operator input element(s) can be provided to permit an operator to input information for processing. The video display device 103 can be provided to display output information generated by the processor module on a screen to the operator, including data that the operator may input for processing, information that the operator may input to control processing, as well as information generated during processing. The processor module can generate information for display by the video display device using a so-called "graphical user interface" ("GUI"), in which information for various applications programs is displayed using various "windows."

Although the computer system is shown as comprising particular components, such as the keyboard 102A and mouse 102B for receiving input information from an operator, and a video display device for displaying output information to the operator, it will be appreciated that the computer system may include a variety of components in addition to or instead of those depicted in FIG. 3.

In addition, the processor module can include one or more network ports, generally identified by reference number 104, which are connected to communication links which connect the computer system in a computer network. The network ports enable the computer system to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

Figure 4:
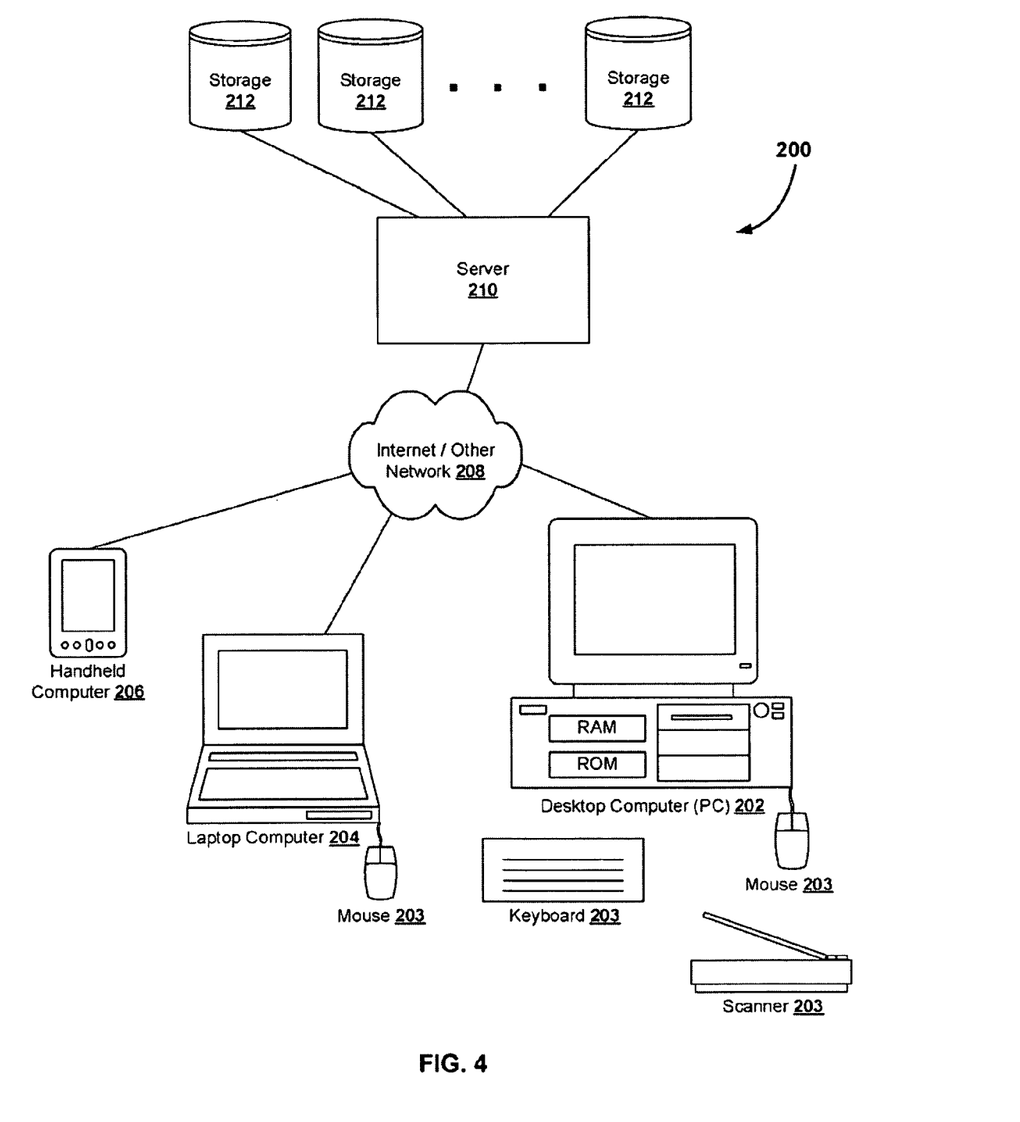

In addition to the computer system shown in the drawings, methods, devices or software products in accordance with the present invention can operate on any of a wide range of conventional computing devices and systems, such as those depicted in FIG. 4 as a network system 200, whether standalone, networked, portable or fixed, including conventional PCs 202, laptops 204, handheld or mobile computers 206, or across the Internet or other networks 208, which may in turn include servers 210 and storage 212.

Figure 5:
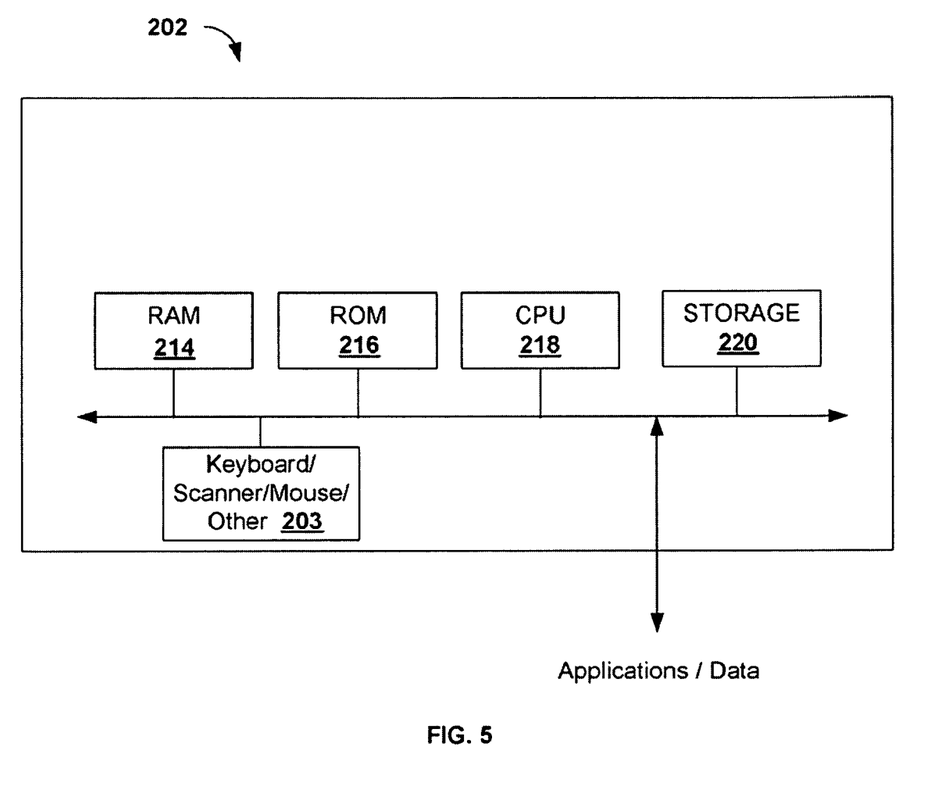

In accordance with conventional computer software and hardware practice, a software application configured in accordance with the invention can operate within, e.g., a PC like that shown in FIGS. 4 and 5, in which program instructions can be read from ROM or CD ROM 216 (FIG. 5), magnetic disk or other storage 220 and loaded into RAM 214 for execution by CPU 218. Data can be input into the system via any known device or means, including a conventional keyboard, scanner, mouse, digitizing tablet, or other elements 203.

Figure 6:
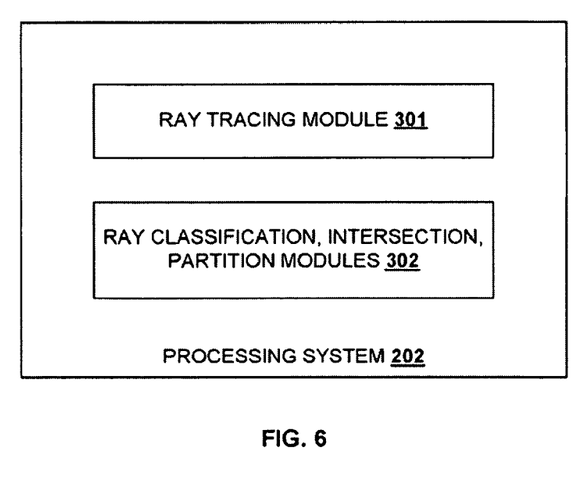

FIG. 6 is a schematic block diagram depicting modules 301, 302 within computer 202 for carrying out operations in accordance with the present invention. Those skilled in the art will understand that such modules can be implemented using known forms of computer hardware elements.

In addition, those skilled in the art will understand that the method aspects of the invention described herein can be executed in hardware elements, such as an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, Calif. The actual semiconductor elements of a conventional ASIC or equivalent integrated circuit are not part of the present invention, and will not be discussed in detail herein. It will be further appreciated that the presently described systems and techniques may also be applied with respect to FPGAs, GPUs, and accelerator units in general.

Those skilled in the art will also understand that ASICs or other conventional integrated circuit or semiconductor elements can be implemented in such a manner, using the teachings of the present invention as described in greater detail herein, to carry out the methods of the present invention as shown, and to implement processing modules within processing system 202, for carrying out a method in accordance with the invention.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to a computer hard disk, computer floppy disk, computer-readable flash drive, computer-readable RAM or ROM element, or any other known means of encoding, storing or providing digital information, whether local to or remote from the workstation, PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts, are not necessarily part of the present invention, and their selection can be left to the implementer.

6. Conclusion

Described herein is a new method, or set of methods, that efficiently trace r rays through n objects using a memory footprint of only o(n+r) (i.e., on the order of (n +r)). Its performance is competitive with approaches that explicitly store an auxiliary acceleration data structure. Many of the previously developed optimizations for ray tracing apply for the new scheme, as well.

Thus, for the first time it is possible to take into consideration both geometry and rays in order to efficiently cull geometry.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method executable in a digital processor operable to simulate light transport in a scene by ray tracing, wherein the digital processor is operable to maintain an object list representing a list of objects associated with a boundary of the scene, the method comprising:

executing a ray tracing method that traces r rays through n objects using a memory footprint of only on the order of (n+r) by (1) partitioning the list of objects associated with a boundary of the scene in a recursive manner to generate partitions and (2) culling away the partitions of objects from rays, without using an explicitly stored auxiliary acceleration data structure, and wherein (a) permutations of rays and objects are storable as index arrays, (b) a ray permutation is utilized, following the recursive partitioning and culling of partitions of objects, to enumerate ray-object intersections by spatial proximity in a manner adapted for Markov chain simulation, which can comprise executing shading and scattering computations or employing a path tracing technique, and (c) an order of recursion is determinable by a majority of ray directions of rays associated with the scene.

2. The method of claim 1 further comprising:

accelerating object list partitioning or ray classification by utilizing a construct representing a plurality of objects associated with a boundary of the scene instead of treating objects separately, or by tracing a plurality of rays instead of one.

3. The method of claim 1 wherein a spatial hierarchy is implicitly determined by recursion, and wherein the spatial hierarchy determined by recursion is explicitly stored for reuse.

4. The method of claim 1 further comprising:

generating geometry or rays on demand based on identification information.

5. The method of claim 1 further comprising:
streaming massive geometry in chunks, and
wherein chunks are processed utilizing any of the recursion and culling of claim 1.

6. The method of claim 1 further comprising:
partitioning object space or partitioning a ray space to efficiently stream massive geometry.

7. The method of claim 1 further comprising:
checking n objects for intersection by (1) partitioning the object list in a recursive manner to generate partitions and (2) culling away the partitions of objects from other objects, without employing an explicitly stored auxiliary acceleration data structure.

8. The method of claim 7 further comprising:
partitioning object space or partitioning a ray space.

9. The method of claim 2 wherein the accelerating further comprises utilizing a scene graph.

10. The method of claim 2 wherein the accelerating further comprises executing a computation by bucket sorting objects, associated with a boundary of the scene, in object space or rays in ray space.

11. The method of claim 2 wherein the accelerating further comprises recursively clustering m subsequent objects.

12. The method of claim 1 further comprising:
executing a collision detection technique comprising checking n objects for intersection,
wherein the checking of n objects for intersection comprises employing a spatial partition technique that recursively partitions space, without using an explicitly stored auxiliary acceleration data structure.

13. A computer program product operable in a digital computer processor operable to simulate light transport in a scene by ray tracing, wherein the digital processor is operable to maintain an object list representing a list of objects associated with a boundary of the scene, the computer program product comprising computer executable program instructions stored in a non-transitory computer readable medium, the computer executable program instructions stored in the non-transitory computer readable medium comprising:
computer program instructions that when executed by the digital processor cause the digital processor to execute a ray tracing method that traces r rays through n objects using a memory footprint of only on the order of (n+r) by (1) partitioning the list of objects associated with a boundary of the scene in a recursive manner to generate partitions and (2) culling away the partitions of objects from rays, without using an explicitly stored auxiliary acceleration data structure, and wherein
(a) permutations of rays and objects are storable as index arrays,
(b) a ray permutation is utilized, following the recursive partitioning and culling of partitions of objects, to enumerate ray-object intersections by spatial proximity in a manner adapted for Markov chain simulation, which can comprise executing shading and scattering computations or employing a path tracing technique, and
(c) an order of recursion is determinable by a majority of ray directions of rays associated with the scene.

14. The computer program product of claim 13 further comprising:
computer program instructions that when executed by the digital processor cause the digital processor to accelerate object list partitioning or ray classification by utilizing a construct representing a plurality of objects associated with a boundary of the scene instead of treating objects separately, or by tracing a plurality of rays instead of one.

15. The computer program product of claim 13 further comprising:
computer program instructions that when executed by the digital processor cause the digital processor to implicitly determine a spatial hierarchy by recursion, and wherein the spatial hierarchy determined by recursion is explicitly stored for reuse.

16. The computer program product of claim 13 further comprising:
computer program instructions that when executed by the digital processor cause the digital processor to generate geometry or rays on demand based on identification information.

17. The computer program product of claim 13 further comprising:
computer program instructions that when executed by the digital processor cause the digital processor to stream massive geometry in chunks, and wherein chunks are processed utilizing any of recursion and culling.

18. The computer program product of claim 13 further comprising:
computer program instructions that when executed by the digital processor cause the digital processor to partition object space or partition a ray space to efficiently stream massive geometry.

19. The computer program product of claim 13 further comprising:
computer program instructions that when executed by the digital processor cause the digital processor to check n objects for intersection by (1) partitioning the object list in a recursive manner to generate partitions and (2) culling away the partitions of objects from other objects, without employing an explicitly stored auxiliary acceleration data structure.

20. The computer program product of claim 19 further comprising:
computer program instructions that when executed by the digital processor cause the digital processor to partition object space or partition ray space.

21. The computer program product of claim 14 wherein the computer program instructions that when executed by the digital processor cause the digital processor to accelerate object list partitioning or ray classification further comprise computer program instructions that when executed by the digital processor cause the digital processor to utilize a scene graph.

22. The computer program product of claim 14 wherein the computer program instructions that when executed by the digital processor cause the digital processor to accelerate object list partitioning or ray classification further comprise computer program instructions that when executed by the digital processor cause the digital processor to execute a computation by bucket sorting objects, associated with a boundary of the scene, in object space or rays in ray space.

23. The computer program product of claim 14 wherein the computer program instructions that when executed by the digital processor cause the digital processor to accelerate object list partitioning or ray classification further comprise computer program instructions that when executed by the digital processor cause the digital processor to recursively cluster m subsequent objects.

24. The computer program product of claim 13 further comprising:
computer program instructions that when executed by the digital processor cause the digital processor to execute a collision detection technique comprising checking n objects for intersection, wherein the checking of n objects for intersection comprises employing a spatial partition technique that recursively partitions space, without using an explicitly stored auxiliary acceleration data structure.

25. A subsystem operable in a digital processor operable to simulate light transport in a scene by ray tracing, wherein the digital processor is operable to maintain an object list representing a list of objects associated with a boundary of the scene, the subsystem comprising:
- a module operable to execute a ray tracing method that traces r rays through n objects using a memory footprint of only on the order of (n+r) by (1) partitioning the list of objects associated with a boundary of the scene in a recursive manner to generate partitions and (2) culling away the partitions of objects from rays, without using an explicitly stored auxiliary acceleration data structure, wherein
  (a) permutations of rays and objects are storable as index arrays,
  (b) a ray permutation is utilized, following the recursive partitioning and culling of partitions of objects, to enumerate ray-object intersections by spatial proximity in a manner adapted for Markov chain simulation, which can comprise executing shading and scattering computations or employing a path tracing technique, and
  (c) an order of recursion is determinable by a majority of ray directions of rays associated with the scene.

26. The subsystem of claim 25 further comprising:
a module operable to accelerate object list partitioning or ray classification by utilizing a construct representing a plurality of objects associated with a boundary of the scene instead of treating objects separately, or by tracing a plurality of rays instead of one.

27. The subsystem of claim 25 wherein a spatial hierarchy is implicitly determined by recursion, and wherein the spatial hierarchy determined by recursion is explicitly stored for reuse.

28. The subsystem of claim 25 further comprising:
a module operable to generate geometry or rays on demand based on identification information.

29. The subsystem of claim 25 further comprising:
a module operable to stream massive geometry in chunks, and
wherein chunks are processed utilizing any of recursion or culling.

30. The subsystem of claim 25 further comprising:
a module operable to partition object space or ray space to efficiently stream massive geometry.

31. The subsystem of claim 25 further comprising:
a module operable to check n objects for intersection by (1) partitioning the object list in a recursive manner to generate partitions and (2) culling away the partitions of objects from other objects, without employing an explicitly stored auxiliary acceleration data structure.

32. The subsystem of claim 31 further comprising:
a module operable to partition object space or ray space.

33. The subsystem of claim 26 wherein the module operable to accelerate further comprises a module operable to utilize a scene graph.

34. The subsystem of claim 26 wherein the module operable to accelerate further comprises a module operable to execute a computation by bucket sorting objects, associated with a boundary of the scene, in object space or rays in ray space.

35. The subsystem of claim 26 wherein the module operable to accelerate further comprises a module operable to recursively cluster m subsequent objects.

36. The subsystem of claim 25 further comprising:
a module operable to execute a collision detection technique comprising checking n objects for intersection,
wherein the checking of n objects for intersection comprises employing a spatial partition technique that recursively partitions space, without using an explicitly stored auxiliary acceleration data structure.

* * * * *